(12) United States Patent
Schaefer et al.

(10) Patent No.: US 8,356,946 B2
(45) Date of Patent: Jan. 22, 2013

(54) INTERCHANGEABLE WHEEL BEARING UNIT, FOR EXAMPLE FOR COMMERCIAL VEHICLES AND METHOD FOR ASSEMBLING A WHEEL BEARING UNIT

(75) Inventors: Marc-Andre Schaefer, Schweinfurt (DE); Robert Heuberger, Schweinfurt (DE); Wolfram Henneberger, Memmelsdorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1025 days.

(21) Appl. No.: 12/296,781

(22) PCT Filed: Mar. 31, 2007

(86) PCT No.: PCT/DE2007/000585
§ 371 (c)(1),
(2), (4) Date: Nov. 5, 2008

(87) PCT Pub. No.: WO2007/115539
PCT Pub. Date: Oct. 18, 2007

(65) Prior Publication Data
US 2009/0175570 A1  Jul. 9, 2009

(30) Foreign Application Priority Data

Apr. 12, 2006 (DE) .................. 10 2006 017 162

(51) Int. Cl.
*F16C 33/78* (2006.01)
*B60B 27/02* (2006.01)

(52) U.S. Cl. ......... 384/589; 384/477; 384/571; 384/584
(58) Field of Classification Search ............. 384/560, 384/561, 564, 584, 585, 589, 448, 477, 571
See application file for complete search history.

(56) References Cited

U.S. PATENT DOCUMENTS

| | | | | | |
|---|---|---|---|---|---|
| 2,945,730 | A | * | 7/1960 | Murray et al. | 384/480 |
| 4,770,424 | A | * | 9/1988 | Otto | 277/351 |
| 4,819,949 | A | * | 4/1989 | Otto | 277/351 |
| 5,044,782 | A | * | 9/1991 | Jankowski | 384/482 |
| 7,618,195 | B2 | * | 11/2009 | Dagh | 384/589 |

FOREIGN PATENT DOCUMENTS

| | | |
|---|---|---|
| DE | 198 33 436 A | 2/1999 |
| WO | 94/27055 Y | 11/1994 |
| WO | 2004/099637 | 11/2004 |

\* cited by examiner

*Primary Examiner* — William C Joyce
(74) *Attorney, Agent, or Firm* — Lucas & Mercanti, LLP; Klaus P. Stoffel

(57) ABSTRACT

The interchangeable wheel bearing unit has a wheel hub and two tapered roller bearings, each having an outer ring and an inner ring, between which a respective row of tapered rollers is situated, and a securing ring in at least one of the inner rings of the tapered roller bearing. To assemble the wheel bearing unit without special tools, each outer ring of the tapered roller bearings has a cylindrical extension, which runs coaxially with the wheel hub axis towards the outer face of the bearing and into which a respective seal is inserted, and a retaining element, which is supported on the corresponding inner ring and axially fixes the outer ring, is located on the opposite face of the respective tapered roller bearing from the seal.

6 Claims, 6 Drawing Sheets

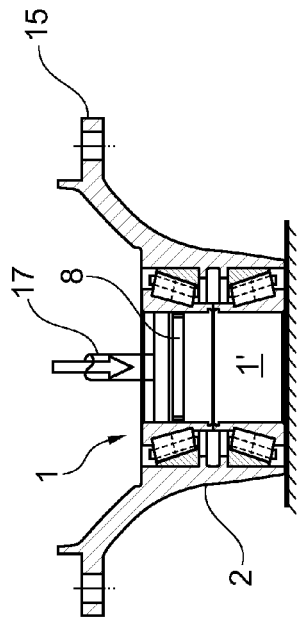
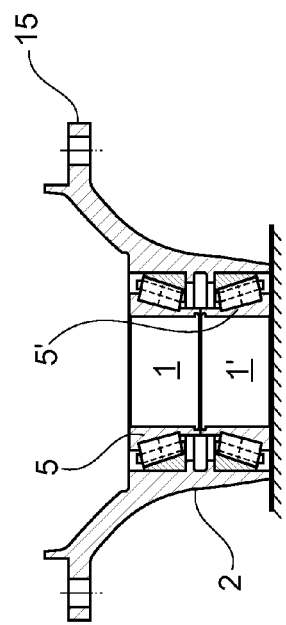
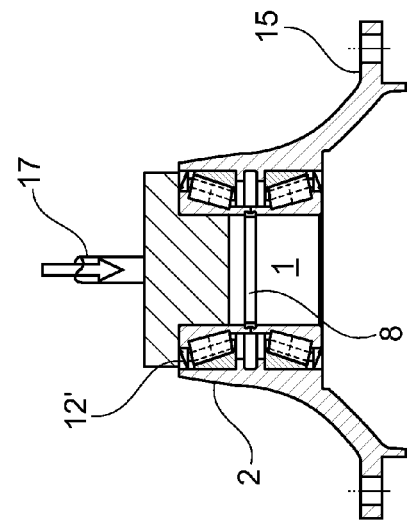
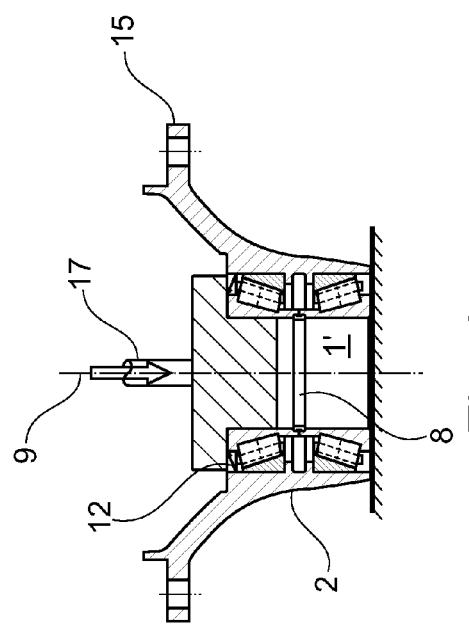

INTERCHANGEABLE WHEEL BEARING UNIT, FOR EXAMPLE FOR COMMERCIAL VEHICLES AND METHOD FOR ASSEMBLING A WHEEL BEARING UNIT

This application is a 371 of PCT/DE2007/000585 filed Mar. 31, 2007, which in turn claims the priority of DE 10 2006 017 162.4 filed Apr. 12, 2006, the priority of both applications is hereby claimed and both applications are incorporated by reference herein.

FIELD OF THE INVENTION

The invention relates to an interchangeable wheel bearing unit, for example for commercial vehicles, having a wheel hub and two tapered roller bearings which each have an outer ring and an inner ring, between each of which one row of tapered rollers is mounted, and having a securing ring in at least one of the two tapered roller bearings. Furthermore, the invention relates to a method for producing an interchangeable wheel bearing unit of this type.

BACKGROUND OF THE INVENTION

As is known, wheel bearings and wheel hubs are highly loaded parts for wheel suspension systems on the chassis of a motor vehicle, which have to withstand a very wide variety of operating loads, in particular in the case of commercial vehicles. A high service life and maintenance free use of the wheel bearings and wheel hubs are decisive competitive advantages for the operators of commercial vehicles of this type.

What are known as insert tapered roller bearing units are used predominantly in wheel bearing units for commercial vehicles.

DE 198 33 436 A1 has disclosed a hub unit complete bearing which has a double row tapered roller bearing with an inner ring, outer rings and, between them, a multiplicity of tapered rollers which are held by a cage. Furthermore, annular seals are provided on both sides of the tapered roller bearing. An inner ring is applied to part of the external circumference of the hub; a second inner ring is formed by part of the outer side of the hub.

Now, if there is damage to the bearing of a wheel bearing unit which is constructed in this way or similarly, presently the entire wheel hub unit is exchanged and scrapped, although the wheel hub itself in fact can still be used.

Even if the mounting of a wheel bearing unit of this type is carried out, for example, in a workshop, said mounting comprises a multiplicity of mounting steps according to the prior art, as are illustrated by way of example and in a simplified manner in FIGS. 1-9, namely:

FIG. 1 cleaning of the wheel hub 2,

FIG. 2 greasing of the inner ring roller crown rings 6, 6',

FIG. 3 pressing the outer ring 4 of the first tapered roller bearing 1 into the wheel hub 2, FIG. 4 pressing the outer ring 4' of the second tapered roller bearing 1' into the wheel hub 2, FIG. 5 placing the wheel hub 2 onto the inner ring 5 of the second tapered roller bearing 1', FIG. 6 inserting the inner ring 5 and the tapered roller crown ring of the first tapered roller bearing 1 into the wheel hub 2, FIG. 7 pushing the securing ring 8 into the wheel hub 2 and latching it on the two inner rings 5, 5', FIG. 8 inserting the seal 12 of the first tapered roller bearing 1 into the wheel hub 2, and FIG. 9 mounting the seal 12' of the second tapered roller bearing 1 into the wheel hub 2.

In said mounting steps, the wheel bearing has to be rotated or turned frequently. Further disadvantages are that the outer rings are not connected fixedly to a dirt protection means or to the seals. Furthermore, two different seals and two different inner rings are often necessary.

The wheel bearing unit is greased during the mounting, with the result that high requirements have to be made of the cleanliness during the mounting process.

Furthermore, DE 198 33 436 A1 relates to a method for manufacturing said hub unit complete bearing which manages with fewer manufacturing steps.

Here, first of all first and second roller cage components are manufactured. Afterward, the first and second roller cage components are inserted into the common outer ring. Subsequently, the hub is pushed into the structural assembly comprising the first and second roller cage components and then the inner ring is mounted onto the hub. This manufacturing method is realized in a relatively complicated manner, since the outer ring and the inner ring have to be mounted separately in addition to the roller cage components.

It would be more economical, in particular for the operator of the commercial vehicle, to retain the wheel hub and to change only the defective wheel bearing or both wheel bearings. However, it is assumed that, in the case of insert wheel bearings with tapered roller bearings, the repair workshops cannot be expected to deal with the complicated and challenging dismantling and mounting of the wheel bearing units. Corresponding knowhow, special tools and absolute cleanliness would be required for mounting the wheel bearing unit, which cannot usually be presupposed in many workshops. An exchange of the complete wheel hub unit is therefore complicated and expensive.

OBJECT OF THE INVENTION

The invention is based on the object of proposing an interchangeable wheel bearing unit and a method for manufacturing a wheel bearing unit of this type, which wheel bearing unit can be mounted without specific expert knowledge and without special tools using simple auxiliary tools which are present in the repair workshops, without special requirements for the cleanliness during assembly.

SUMMARY OF THE INVENTION

The invention is based on the realization that, in the event of damage to the wheel bearing, the complete exchange of the wheel hub unit is uneconomical and more expensive than the exchange only of the wheel bearing.

The invention therefore proceeds from an interchangeable wheel bearing unit, for example for commercial vehicles, having a wheel hub and two tapered roller bearings, each of which have one outer ring and one inner ring, between each of which one row of tapered rollers is mounted, and having a securing ring in at least one of the inner rings of the tapered roller bearings.

In addition, there is provision, in order to achieve the stated object, for the respective outer ring of the two tapered roller bearings to have a cylindrical extension which is directed toward the bearing outer side coaxially with respect to the wheel hub axis and into each of which one seal is inserted, and for a holding element which fixes the outer ring axially and is supported on the respective inner ring to be arranged on the side of the respective tapered roller bearing which lies opposite the seal.

Both elements, that is to say the seal and the holding element, are preferably provided for the purpose of achieving a dirt protection function and a holding function, that is to say holding the inner and outer rings together.

This construction advantageously provides a preassembled wheel bearing unit, for example for commercial vehicles, which can be exchanged more simply in the spare part business. The wheel bearing unit which is preassembled in this way represents a sealed mounting for a wheel hub, which mounting is lubricated for a long service life.

The cylindrical extension which is formed on the respective outer ring of the two tapered roller bearings and is directed toward the bearing outer side coaxially with respect to the wheel hub axis serves in each case as a seat for the seals of the bearings. Furthermore, the holding element which fixes the outer ring axially and is supported at the same time on the inner ring is dimensioned in such a way that a lubricant depot is formed, which preferably comprises a lubricating grease and supplies the tapered roller bearing with lubricant during operation. To this end, the holding element forms a lubricant receptacle space together with the outer ring and the inner ring.

In order for it to be possible to carry out the mounting of the individual tapered roller bearings with a simple flat plate or a similar component, without the mounting forces which occur acting on the tapered rollers and possibly damaging the anti-friction bearing raceways on the inner ring or outer ring, the width and the axial length of the respective outer ring is selected in such a way that the mounting forces are directed only onto the respective outer ring. According to a further refinement of the wheel bearing unit according to the invention, this is achieved by virtue of the fact that that cylindrical extension of the respective outer ring which is directed toward the bearing outer side coaxially with respect to the wheel hub axis protrudes slightly with respect to the end side of the associated inner ring, that is to say is axially longer than the associated inner ring.

The projection of the cylindrical extension of the respective outer ring is, in this context, dimensioned in such a way that said projection is also sufficiently big while the outer ring is pressed into the wheel hub and during the associated constriction of the outer ring and the resulting axial offset of the tapered roller contact point. This ensures that the associated inner ring can be followed up and no mounting forces are directed onto the tapered rollers.

The invention also relates to a method for manufacturing an interchangeable wheel bearing unit, for example for commercial vehicles, having a wheel hub and two tapered roller bearings each of which have one outer ring and one inner ring, between each of which one row of tapered rollers is arranged, and having a securing ring in at least one of the inner rings of the tapered roller bearings, the two tapered roller bearings being preassembled as one structural assembly each. The method has the following manufacturing steps:

pressing the first tapered roller bearing which is completely preassembled as a structural assembly axially into the wheel hub, pressing the second tapered roller bearing which is completely preassembled as a structural assembly axially into the wheel hub, and pushing the securing ring axially into corresponding grooves of at least one of the inner rings of one of the two tapered roller bearings, in particular into corresponding grooves of the two inner rings of the two tapered roller bearings.

Accordingly, the interchangeable wheel bearing unit can be manufactured or mounted in a maximum of three steps.

Optionally, the step of pushing the securing ring axially into the corresponding grooves of both inner rings can be omitted if, according to a further refinement of the method according to the invention, the securing ring is already preassembled in a corresponding groove of one of the inner rings, and then latches into the corresponding groove of the other inner ring when the second tapered roller bearing is pressed in axially.

Moreover, there is preferably provision for the two tapered roller bearings to be pushed into the wheel hub from axially opposite directions.

The wheel bearing unit which is mounted in this way makes simpler handling possible during its mounting and/or exchange, for example in a commercial vehicle repair workshop. The mounting can be performed by way of a few simple installation steps. Furthermore, less stringent requirements are to be made of the cleanliness during mounting, since the structural assembly according to the invention is a preassembled unit, in which the two tapered roller bearings with inner ring, outer ring and the remaining associated parts are already completed, greased and sealed against dirt.

Moreover, the wheel bearing unit can be transported and handled in a self-supporting manner. This saves mounting time compared with mounting of all the individual parts and saves mounting costs in comparison with the purchase of a bearing and a hub, since the use of a preassembled structural assembly of this type is considerably less expensive than the exchange of the complete hub unit.

Further advantages result from the prefabrication and preassembly of the tapered roller bearings themselves. The outer ring of the respective tapered roller bearing is already connected fixedly to the seal before it is installed into the wheel hub and protects the interior of the respective tapered roller bearing against contamination. In addition, structurally identical seals from a series can be used for the inner ring and the outer ring. An inner ring, tapered rollers and roller cage from series production can likewise be used.

BRIEF DESCRIPTION OF THE DRAWINGS

First of all, FIGS. 1 to 9 of the appended drawing show a multiplicity of necessary mounting steps during the manufacture of a wheel bearing unit according to the prior art described at the beginning.

In the following text, the invention will be described in greater detail using one embodiment and the drawing, in which.

DETAILED DESCRIPTION OF THE DRAWINGS

Figure 1:
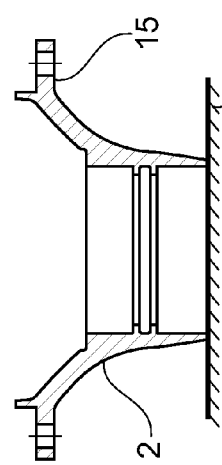
Figure 2:
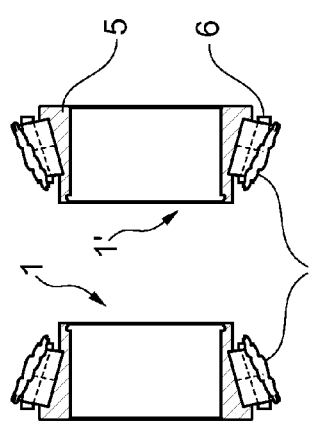
Figure 3:
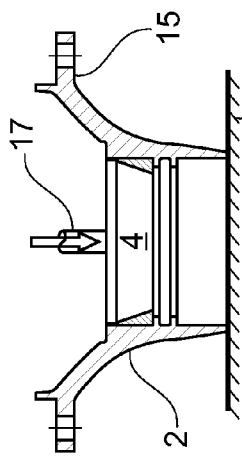
Figure 4:
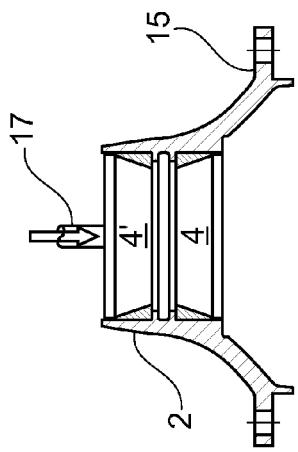
Figure 5:
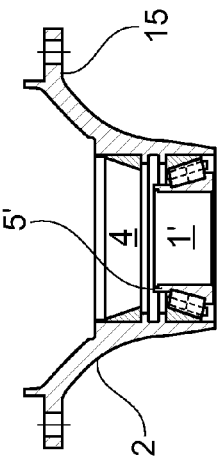
Figure 10:
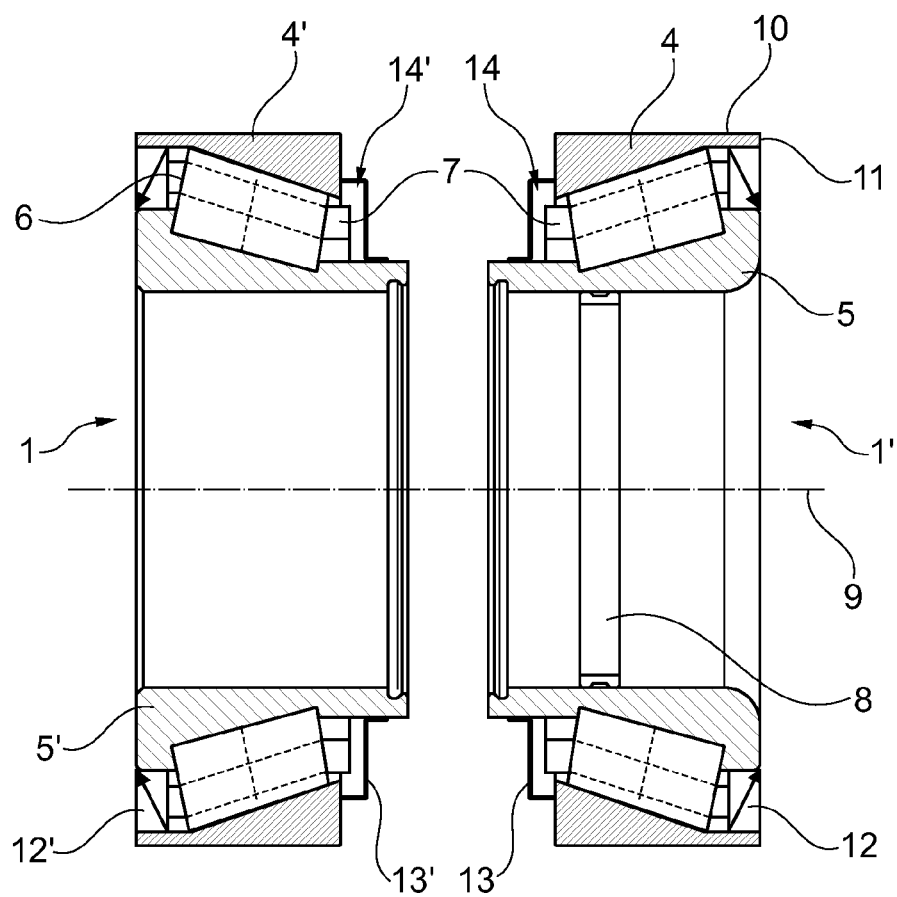
FIG. 10 shows a cross section through two tapered roller bearing structural assemblies which can be inserted into a wheel hub for an interchangeable wheel bearing unit according to the invention.
Figure 11:
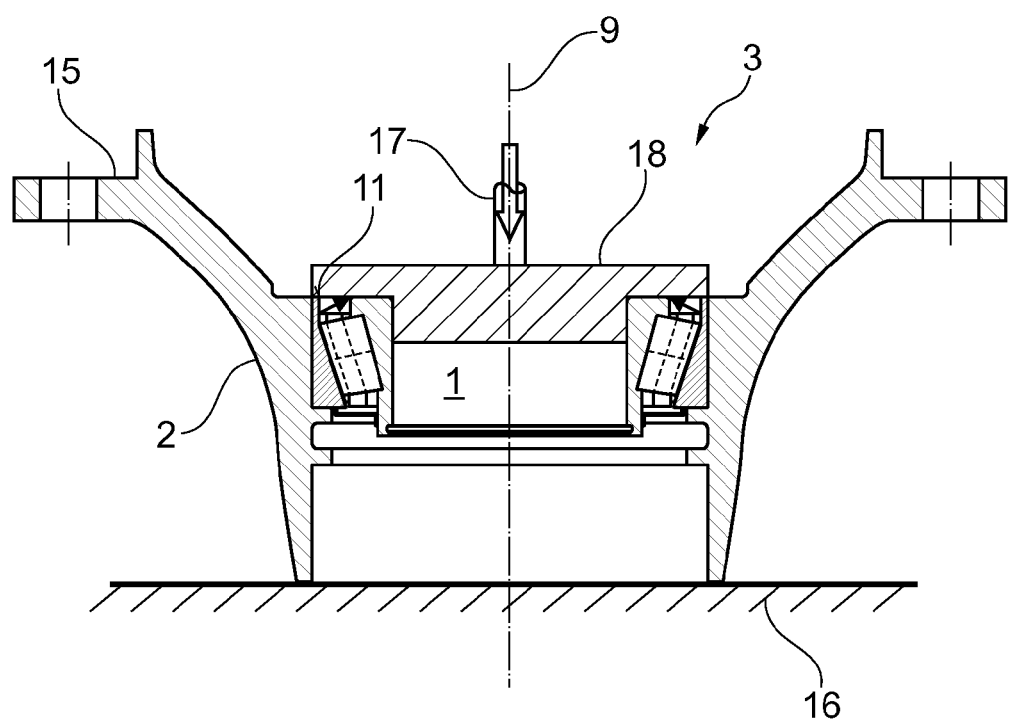
FIG. 11 shows an operation of pressing a first tapered roller bearing according to FIG. 10 into the wheel hub.
Figure 12:
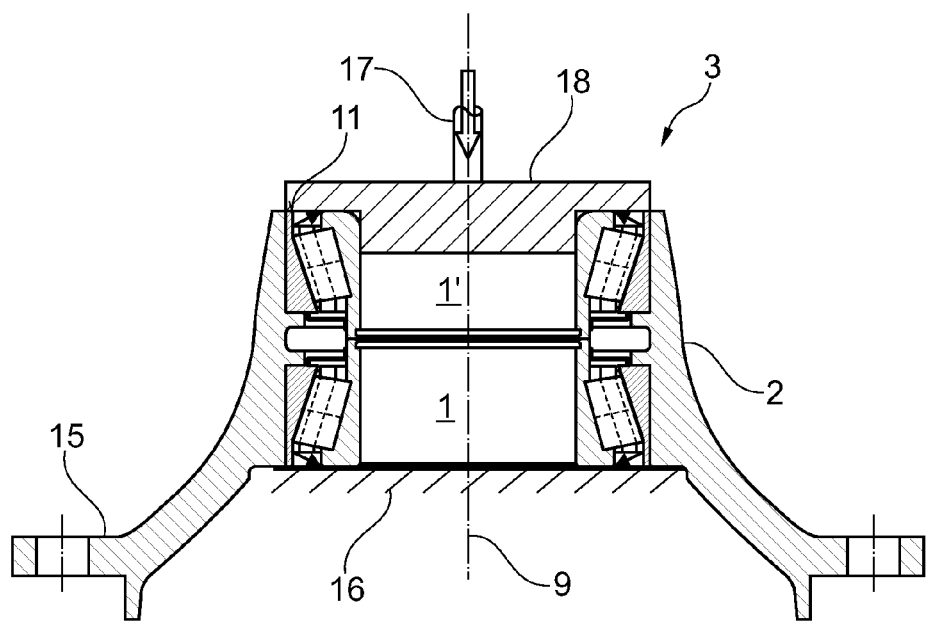
FIG. 12 shows an operation of pressing a second tapered roller bearing according to FIG. 10 into the wheel hub.
Figure 13:
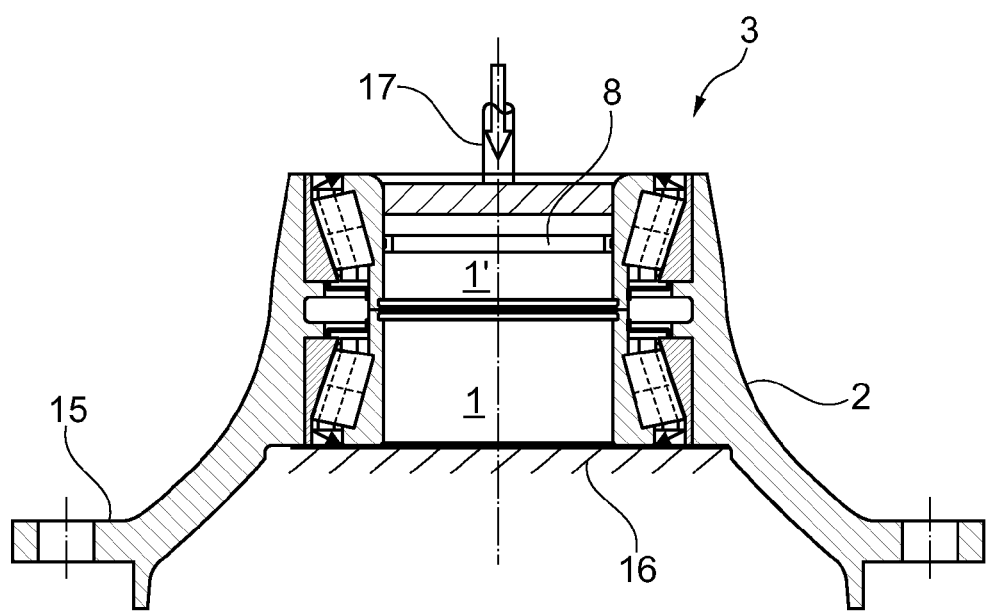
FIG. 13 shows the operation of mounting a securing ring in the wheel bearing unit.

The two tapered roller bearings 1 and 1' which are shown in FIG. 10 and are approximately structurally identical but are arranged inversely with respect to one another are ultimately mounted in this arrangement into a wheel hub 2 of a wheel bearing unit 3, which wheel hub 2 is shown in FIGS. 11 to 13. A tapered roller bearing 1, 1' of this type has an outer ring 4, 4' and an inner ring 5 and 5', between which a row of tapered rollers 6, 6' is arranged. Said tapered rollers 6, 6' are guided in a tapered roller cage 7, 7' in a manner which is known per se.

A securing ring 8 is inserted in the tapered roller bearing 1' according to FIG. 10, which securing ring 8 connects the two inner rings 5, 5' of the tapered roller bearings 1, 1' to one another after their installation into the wheel hub 2 and further axial displacement of the securing ring 8.

The outer ring 4, 4' of each of said two tapered roller bearings 1, 1' has a cylindrical extension 10 which is directed toward the bearing outer side coaxially with respect to the bearing axis or wheel hub axis 9. Said extension 10 protrudes slightly with respect to the end side of the associated inner ring 5, 5', in the form of a projection 11. This has the consequence that, during the mounting of the tapered roller bearing 1, 1' into the wheel hub 2, as shown in FIGS. 11 to 13, no mounting forces act on the tapered rollers 6, but rather that said mounting forces are absorbed solely by the respective outer rings 4, 4'.

The recessed nature of the inner ring 5, 5' with respect to the outer ring 4, 4' can also be taken into consideration by the mounting tool. As a result, however, the mounting tool would become more expensive because of an additional machining step.

A seal 12, 12' is inserted between the cylindrical extension 10 of the respective outer ring 4, 4' which is directed toward the bearing outer side coaxially with respect to the bearing axis or wheel hub axis 9 and the associated inner ring 5, 5'. Furthermore, one holding element 13, 13' each which fixes the outer ring 4, 4' axially, is of approximately Z-shaped cross section and is supported on the inner ring 5 and 5' is arranged on that side of the tapered roller bearing 1, 1' which lies opposite the seal 12 and 12'. Here, the respective holding element 13, 13' forms in each case a lubricant receptacle space 14, 14' together with the outer ring 4, 4' and the inner ring 5, 5'.

According to the method, a first tapered roller bearing 1 which is preassembled as a structural assembly, as explained in the preceding text, is pressed axially into the wheel hub 2 which has a wheel hub flange 15, during the manufacture of the wheel bearing unit 3 according to FIG. 11. To this end, the wheel hub 2 is placed on a flat plate 16 with its side which lies opposite the wheel hub flange 15, while a ram 17, for example of a machine tool or a press, exerts a compressive force via a die 18 having a plate and a guide journal on the first tapered roller bearing 1 against the plate 16 in the arrow direction.

In a second mounting step according to FIG. 12, the wheel hub 2 is placed onto the plate 16 with its side which is close to the wheel hub flange 15. Subsequently, the second tapered roller bearing 1' which is preassembled as a structural assembly is pressed axially into the wheel hub 2, a compressive force once again being exerted on the second tapered roller bearing 1' in the arrow direction by the ram 17 via the die 18. The two tapered roller bearings 1 and 1' are therefore fixed completely with their seals 12 and 12' in the wheel hub 2 of the wheel bearing unit 3.

Finally, in a third manufacturing step, the securing ring 8 can be pushed axially into corresponding grooves of the inner rings 5, 5' by means of the ram 17 of a suitable machine in the arrow direction if this has not already taken place during the mounting of the second tapered roller bearing 1.

LIST OF DESIGNATIONS

1 Tapered roller bearing
1' Tapered roller bearing
2 Wheel hub
3 Wheel bearing unit
4 Outer ring
4' Outer ring
5 Inner ring
5' Inner ring
6 Tapered rollers
6' Tapered rollers
7 Tapered roller cage
7' Tapered roller cage
8 Securing ring
9 Wheel hub axis
10 Cylindrical extension
11 Projection
11' Projection
12 Seal
12' Seal
13 Holding element (with dirt protection/function)
13' Holding element (with dirt protection/function)
14 Lubricant receptacle space
14' Lubricant receptacle space
15 Wheel hub flange
16 Plate
17 Ram
18 Die having a plate and guide journal

The invention claimed is:

1. An interchangeable wheel bearing, comprising:
a wheel hub having an axis of rotation; and
two tapered roller bearings each having one outer ring and one inner ring, the outer ring has a cylindrical extension, which is directed toward a bearing outer side coaxially with respect to the axis of rotation of the wheel hub, one row of tapered rollers is arranged between the outer ring and the inner ring of each of the tapered roller bearings, a securing ring is arranged in at least one of the inner rings of the tapered roller bearings, a seal is inserted between the outer ring and the inner ring of each of the tapered roller bearings and contacts an inner surface of the cylindrical extension of the outer ring and an outer surface of the inner ring, and a holding element engaging an axial end surface of the outer ring, the holding element fixing the outer ring axially, the holding element being supported on the inner ring and the holding element being arranged on a side of each of the tapered roller bearings which lies opposite the seal.

2. The interchangeable wheel bearing unit as claimed in claim 1, wherein the cylindrical extension of the outer ring, which is directed toward the bearing outer side coaxially with respect to the wheel hub axis, is slightly longer than an end side of the inner ring that is associated with the outer ring.

3. The interchangeable wheel bearing unit as claimed in claim 1, wherein the holding element forms a lubricant receptacle space together with the outer ring and the inner ring.

4. The interchangeable wheel bearing unit as claimed in claim 1, wherein the holding element has a first protrusion directed axially toward the bearing outer side, a second protrusion directed axially in an opposite direction of the first protrusion, toward a bearing inner side and a third protrusion, which extends radially between the first protrusion and the second protrusion and connected the first protrusion and the second protrusion.

5. The interchangeable wheel bearing unit as claimed in claim 1, wherein the securing ring is arranged against a radially inner peripheral surface of the inner ring of at least one of the tapered roller bearings.

6. An interchangeable wheel bearing, comprising:
a wheel hub having an axis of rotation; and
a single tapered roller bearing having one outer ring and one inner ring, the outer ring has a cylindrical extension, which is directed toward a bearing outer side coaxially with respect to the axis of rotation of the wheel hub, one row of tapered rollers is arranged between outer ring and the inner ring of the tapered roller bearing, a securing ring is arranged in the inner ring of the tapered roller bearing, a seal is inserted between the outer ring and the inner ring of the tapered roller bearing and contacts an inner surface of the cylindrical extension of the outer ring and an outer surface of the inner ring, and holding element engaging an end surface of the outer ring, the holding element fixing the outer ring axially, the holding element being supported on the inner ring and the holding element being arranged on a side of each of the tapered roller bearings which lies opposite the seal.

* * * * *

UNITED STATES PATENT AND TRADEMARK OFFICE
CERTIFICATE OF CORRECTION

PATENT NO.          : 8,356,946 B2                                            Page 1 of 1
APPLICATION NO.     : 12/296781
DATED               : January 22, 2013
INVENTOR(S)         : Schaefer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1047 days.

Signed and Sealed this

First Day of September, 2015

Michelle K. Lee
*Director of the United States Patent and Trademark Office*